United States Patent [19]
Massonnet

[11] 3,827,848
[45] Aug. 6, 1974

[54] MOLDING PRESSES
[76] Inventor: Henry Massonnet, Nurieux (Ain), France
[22] Filed: Oct. 16, 1972
[21] Appl. No.: 297,673

[30] Foreign Application Priority Data
Oct. 29, 1971 France.............................. 71.39880

[52] U.S. Cl.............................. 425/406, 425/451
[51] Int. Cl.............................................. B29c 3/00
[58] Field of Search ....... 425/242, 406, 405 H, 450, 425/451

[56] References Cited
UNITED STATES PATENTS

| | | | |
|---|---|---|---|
| 2,138,047 | 11/1938 | Turner | 425/451 X |
| 2,692,407 | 10/1954 | Stacy | 425/406 |
| 2,718,030 | 9/1955 | Collins et al. | 425/451 X |
| 2,812,543 | 11/1957 | Stacy | 425/406 |
| 3,142,093 | 7/1964 | Tribbett | 425/406 |
| 3,307,220 | 3/1967 | Underwood | 425/451 X |
| 3,337,909 | 8/1967 | Loges et al. | 425/451 X |
| 3,550,199 | 12/1970 | Landa | 425/405 H X |

Primary Examiner—Robert L. Spicer, Jr.
Attorney, Agent, or Firm—Alexander & Dowell

[57] ABSTRACT

In an injection press of the vertical type, the locking platen is made in two parts which form a locking jack, the movable member of which is connected to a track. A movable balk member suspended from a fixed guide can be brought to a position beneath the said movable member of the locking jack in order to lock the moving plate of the press. Alignment of the track and of the guide is effected by the co-operation of the oblique ends of these two elements.

6 Claims, 4 Drawing Figures

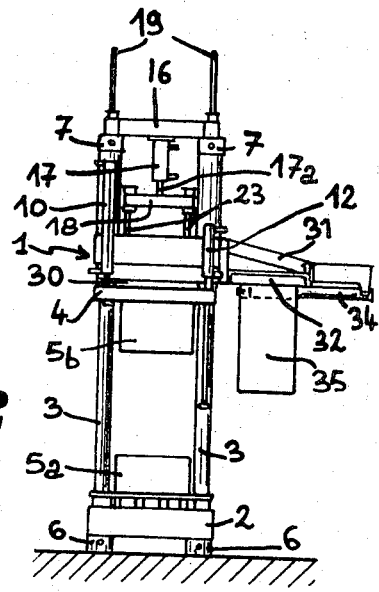
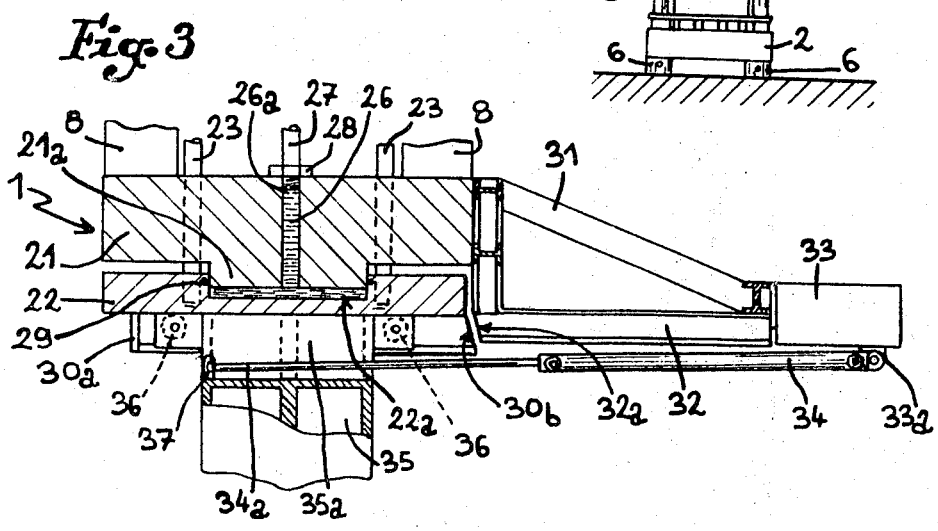
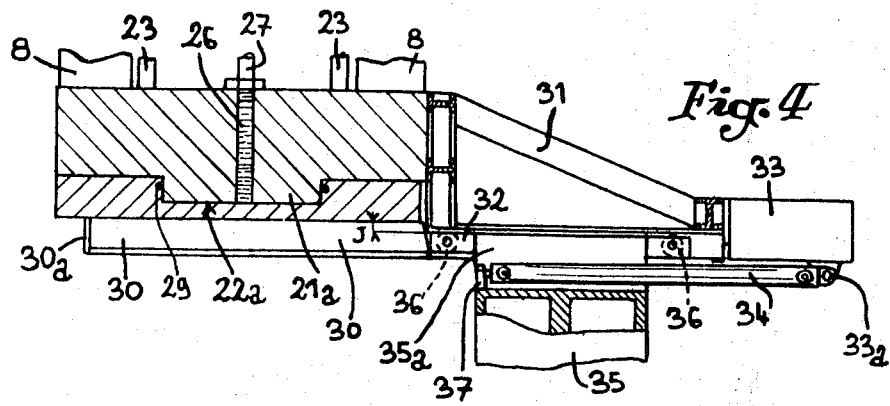

MOLDING PRESSES

This invention relates to improvements to molding presses, and more particularly molding presses adapted to the injection of synthetic plastic material; the invention applies more particularly to a vertical press.

In machines of this type, in which there is a considerable opening travel and a very high closing force, it has already been proposed to connect the locking jack to one of the fixed platens of the machine, the jack stroke being relatively short, and to lock the mold in the closed position by interposing a balk member between the said jack and the moving plate which bears one of the parts of said mold.

The devices provided heretofore for the purpose of bringing the balk member into position before the locking operation and withdrawing it after said operation have not been fully satisfactory to the users, either because they are too complicated, and hence unreliable in operation, or because their cost price was too high.

The object of the improvements according to this invention is to obviate the above disadvantages and provide a vertical injection molding press in which the balk member is moved by a simple and cheap device.

The injection molding machine according to the invention, of the type comprising a quick-action moving plate supporting one of the parts of the conventional mold, a short-stroke jack connected to the machine frame and adapted to lock the two parts of the mold, and a movable balk member adapted to transmit the force developed by the jack to the moving plate, is characterized in that the bottom surface of the movable part of the jack is connected to a track over which the balk member moves, means being provided to allow exact alignment of said track and a fixed guide on which the said balk member is placed before opening of the moving plate.

In a preferred embodiment, the means adapted to allow alignment of the track and the guide comprise the facing ends of these two elements, which are made oblique in the same direction and inclined with the same slope.

The invention will now be described, merely by way of example, with reference to the accompanying drawings, in which:

FIG. 2 is a side view to a smaller scale.

FIG. 3 is a partial section on the line III—III in FIG. 1.

FIG. 4 is a similar view to FIG. 3 but showing the balk member in a different position.

Figure 1:
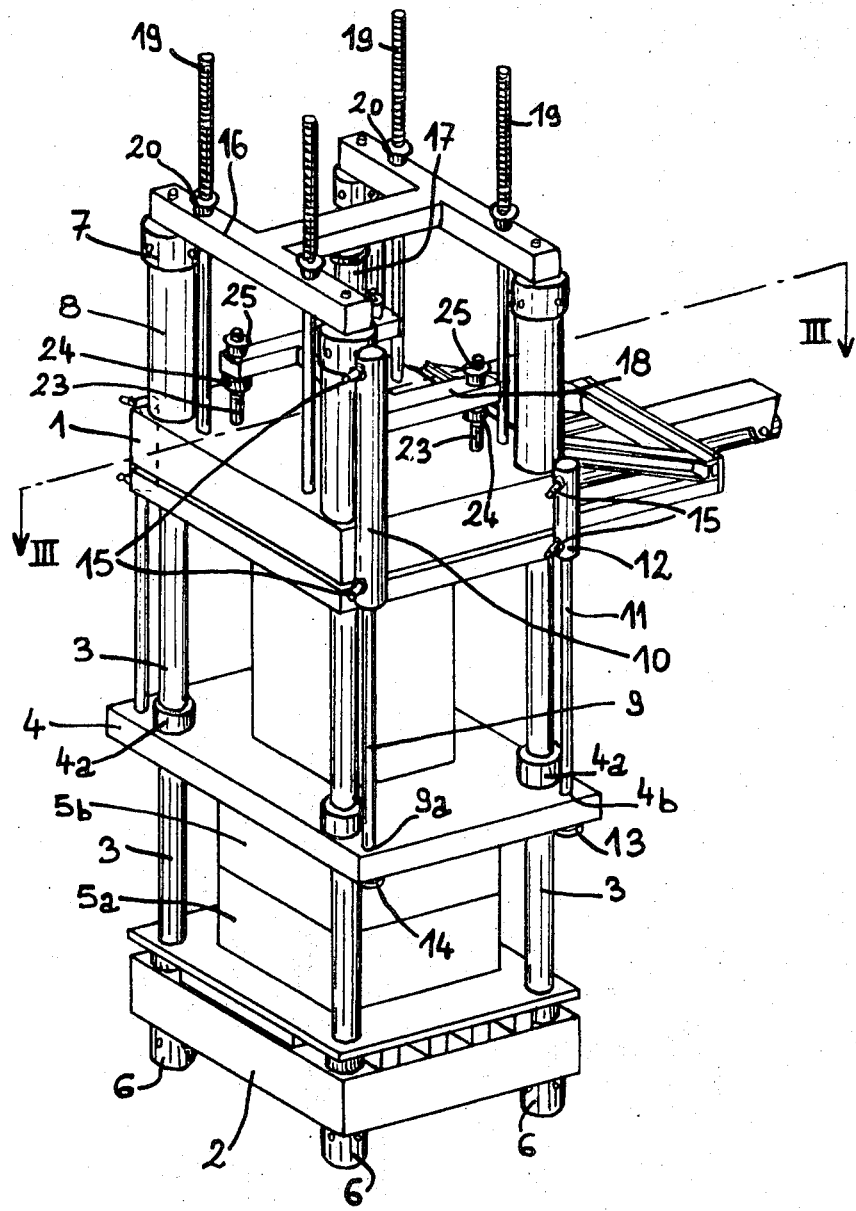
FIG. 1 is a general perspective of a machine to which the invention has been applied. To avoid overloading the drawing, the plastic material injection device has not been shown.

The vertical press shown in FIGS. 1 and 2 comprises, in known manner, two fixed platens 1 and 2 connected by four columns 3, on which a moving plate 4 provided with sleeves 4a slides. The bottom part 5a of the mold 5 is attached to the platen 2, while the top part 5b of this mold is connected to the moving plate 4, or vice-versa. The columns 3 are secured by nuts 6 which bear on the bottom surface of the platen 2, while above the platen 1 they receive nuts 7 which act on tubular members 8 bearing on the top surface of the platen 1.

The dimensions of the moving plate 4 are greater than those of the platen 1 and outside the columns 3 the plate is coupled to the rods 9 of two hydraulic jacks, the cylinders 10 of which are secured to the periphery of the platen 1 and along a diagonal thereof. Along the other diagonal, the plate 4 is connected to the rods 11 of twy hydraulic jacks, the cylinders 12 of which are each fixed against the platen 1.

The free end of each of the rods 9 is connected to the plate 4, while the rods 11 extend through bores 4b in said plate, the ends of the rods receiving a nut 13 which acts as a stop. The ends of each of the rods 9 comprises a shoulder 9a which defines a smaller-diameter end part extending through a bore of corresponding dimensions in the plate 4, such part receiving a lock nut 14.

Each cylinder 10, 12 receives fluid under pressure via conduits (not shown) leading to suitably disposed connections 15.

The top ends of the columns 3 are connected to an H-shaped support 16. The cross-bar of the H supports a pressure-fluid jack 17 whose rod 17a is connected to a crosshead 18 disposed beneath the support 16. Rods 19 extend through the support 16, one of the ends of said rods being screwed into the top part of the platen 1, while the other screwthreaded end receives a nut 20. It will be apparent that the rods 19 hold the platen 1 against the tubular members 8 and the nuts 7.

The platen 1 is made in two parts (FIG. 3), viz., a fixed or locking plate 21 and a moving or locking pad 22. The locking plate 21 of the platen has a circular boss 21a at the centre engaging in a blind bore 22a formed in the pad 22. The latter is connected to the bottom end of four retaining columns 23 which extend through the plate 21 of the platen 1 in such manner that the top ends of said columns are fixed on the crosshead 18 by means of nuts 24 and locknuts 25.

The space between the boss 21a and the bore 22a is connected via a port 26 to a pressure fluid conduit 27 which leads to a connection 28 screwed into the top screwthreaded part 26a of the port 26. A gasket 29 is disposed in the periphery of the bore 22a to provide a seal between the boss 21a and the bore. In this way the boss 21a and the bore 22a form a pressure fluid actuated locking means.

The bottom surface of the pad 22 is connected to a track 30 formed by two U-sections disposed symmetrically with respect to one of the centre-lines of the platen 1, the U-sections having the open ends facing one another. A stop 30a is provided at one of the ends (the left-hand end in FIGS. 2, 3 and 4) of the track while its opposite end 30b is bevelled with a downwardly-divergent oblique configuration. The point of origin of the end 30b is situated at the corresponding vertical surface of the pad 22.

The locking plate 21 is connected to a triangular frame 31, the horizontal base of which is formed by a guide 32 and made in the form of two U-sections, the open ends of which face one another and which is disposed in extension of the section members 30. The end 32a of the guide 32 situated nearest the pad 22 is oblique with the slope extending in the same direction as the oblique slope of the end 30b of the section members 30, while the inclination of this slope is of a similar value to that of the said end 30b.

The frame 31 is connected to a support 33, the bottom surface of which has a fork 33a in which the cylinder of a pressure fluid jack 34 is mounted pivotably.

Rollers 36 adapted to roll inside the bottom flanges of the track 30 and guide 32 are provided at the top part of a balk member 35 of generally parallelepipedic shape made from welded metal sheets. The top part of the member 35 is formed with a horizontal central aperture 35a which extends completely through it and the geometric axis of which is parallel to the general direction of the track 30 and guide 32. The rod 34a of the jack 34 extends through said aperture and its end is articulated in a fork 37 connected to the bottom surface of the aperture 35a and situated as close as possible to the centre of the platens so as to reduce the space taken up on the outside by the said jack 34.

The operation of the system is apparent from the foregoing, and is as follows:

With the press in the position shown in FIG. 2, the moving plate 4 is situated against the platen 1 and the mold 5 is open. In this position, the pad 22 is pulled up (see FIG. 4) by the columns 23 connected to the jack 17 through the agency of the crosshead 18, so that the jack formed by the boss 21a and the bore 22a is retracted. To close the mold, the two jacks 10 are actuated so that the moving plate 4 is moved in the downward direction until the top and bottom parts 5b and 5a respectively are in contact.

With the pad 22 in its raised position, the bottom flange of its track 30 is in alignment with the corresponding flange of the guide 32, the respective ends 30b and 32a of these two parts forming a stop which limits the upward travel of said pad.

The jack 34 can then be extended, with resulting movement of the member 35 between the pad 22 and the moving plate 4 (FIG. 3). The travel of the jack 34 is such that the geometric axis of the balk member is then in alignment with the general axis of the machine.

A pressure fluid is then fed via conduit 27 between boss 21a and bore 22a so as to cause the pad 22 to move downwards. The jack 17 is of course extended at the same time. Downward movement of the pad results in downward movement of the balk member, the base of which bears on the plate 4 so as to lock the mold 5. There is a clearance J between the top of the balk member and the bottom surface of the pad 22 (FIG. 4) so that in the locking position (FIG. 3) the rollers 36 do not bear on the bottom flange of the track 30. Consequently, plastics material under pressure can be injected into the cavity of this mold. It will readily be seen that the jack 34 pivots in its fork 33a during the downward movement of the balk member.

The mold opening operation is effected in the reverse sequence i.e. the pressure between the boss 21a and the bore 22a is stopped, the jack 17 is retracted to raise the pad 22 until the ends 30b and 32a of the track 30 and of the guide 32 are in contact.

The spacer is finally returned to its initial position by the jack 34, and the mold can then be opened.

Opening is effected in two successive stages. The jacks 12 are first actuated and, since their cylinders have a considerable diameter, they readily allow the two parts of the mold to be separated over a short travel. Then the jacks 10 are retracted to bring the plate 4 and the mold part 5b into the raised position. During this travel, the plate 4 slides along the piston rods 11 of the jacks 12.

Horizontal movement of the balk member 35 is thus produced simply and economically without the use of complicated and unreliably operated means.

What is claimed is:

1. In a vertical injection molding machine of the type comprising a quick-action moving plate supporting one of the parts of a conventional mold, a short-stroke jack connected to the machine frame and adapted to lock the two parts of the mold, and a balk member adapted to transmit the force developed by said jack to the moving plate, the improvement wherein the moving part of the jack comprises a track over which the balk member travels, means being provided to allow exact alignment of said track and a fixed guide which acts as a support for the said balk member when the moving plate is in the open position, and wherein the means adapted to allow alignment of the track and the guide comprise the facing ends of these two elements, said ends being oblique in the same direction and inclined with the same slope.

2. The machine according to claim 1, wherein the track and the guide are made from two parallel U-shaped section members, the open ends facing one another.

3. The machine according to claim 2, wherein the balk member is suspended from rollers which cooperate with the bottom flange of the section members which form the track and the guide.

4. The machine according to claim 3, wherein the movement of the balk member is produced by a double-acting hydraulic jack, the cylinder of which is mounted pivotably with respect to the guide.

5. The machine according to claim 4, wherein the balk member is formed with an aperture directed in parallel relationship to the track and to the guide, the piston rod of the double-action hydraulic jack passing through said aperture.

6. The machine according to claim 5, wherein the free end of the piston rod is attached to the balk member at a point thereof which is situated closest to the geometric axis of the machine.

* * * * *